Oct. 31, 1972 R. W. REDO Re. 27,521

MAZE DEVICE

Original Filed April 1, 1968 2 Sheets-Sheet 1

INVENTOR
RONALD W. REDO
BY
Warren, Rubin, Brucker & Chickering
ATTORNEYS

MAZE DEVICE

Original Filed April 1, 1968 2 Sheets-Sheet 2

INVENTOR
RONALD W. REDO
BY
Warren, Rubin, Brucker & Chickering
ATTORNEYS

United States Patent Office

Re. 27,521
Reissued Oct. 31, 1972

27,521
MAZE DEVICE

Ronald W. Redo, 773 Blossom Way,
Hayward, Calif. 94541

Original No. 3,539,190, dated Nov. 10, 1970, Ser. No. 718,984, Apr. 1, 1968. Application for reissue Dec. 16, 1970, Ser. No. 98,970
Int. Cl. A63f *9/08*
U.S. Cl. 273—153 R 6 Claims

Matter enclosed in heavy brackets [ ] appears in the original patent but forms no part of this reissue specification; matter printed in italics indicates the additions made by reissue.

ABSTRACT OF THE DISCLOSURE

A maze device including a board or the like to provide a working surface from which a plurality of pins at various spaced intervals from each other project, thus defining a multiplicity of connected and intersecting paths between the pins. A token is provided so shaped and dimensioned that it can be slidably maneuvered between certain of the pins and not others, and thus the token is movable along a mazelike path on the surface of the board from one station thereon to another remote from the first. The mazelike path or paths which permit passage of a token, and those which do not, are such as not to be visually discernible to the average observer in respect to which will permit such passage until actual movement with the token is undertaken. In addition, certain of the pins are provided with impediments of various shapes positioned at different elevations above the working surface of the board, and these impediments cofunction with portions of the token to permit or bar passage on the path between the pin with the impediment and the one adjacent to it.

Maze devices are generally well known in the toy and amusement art and usually employ labyrinths defined by segments of parallel walls, slots in the playing surface of the device, or the like, through which a movable token is slidably maneuvered. The labyrinthine walls or slots, as the case may be, constrain passage of the token to a particular path from one zone on the playing surface to another remote therefrom. Usually, various alternative routes are available, except that all but a selected one or two lead to so-called "dead-end" or blind passages in the maze, which are visibly discernible; and eventually the player is required to maneuver [maneuver] the playing token to take only those passages which lead to the goal at the end of the maze. However, due to the evident and discernible nature of the passages, such devices are often not as challenging as a good puzzle should be, unless it is quite large with extensive labyrinth arrangements. Yet when of such size and character, these devices may become boring, since they only involve choosing the right passage to slide the token therethrough.

It is an object of the present invention to provide a maze device which is generally more challenging than those of the prior art with which I am familiar, and yet may be contained within a relatively limited working surface.

More particularly, it is an object of the present invention to provide a maze device in combination with a working surface upon which there are paths for movement of the token from one station thereon to another remote therefrom which are not visually discernible to the average user.

Another object of the invention is to provide a maze device wherein the user must choose not only the right path upon which to maneuver the slidable token, but also the right position of the token in its path of travel in order to maintain movement therealong.

Thus a feature of the present invention is that movement of the token along a particular maze path may require not only the choice of the right path but the manner of positioning the token therealong. In this way the present invention has the advantage of being generally more challenging and less boring than prior art maze devices with which I am familiar.

Another feature and advantage of the present invention is that it may be used as a culture-test in clinical psychology for measuring the subject's ability with spatial relations, frustations, and the like.

Further details of the invention are set forth in the following description thereof with reference to the accompanying drawings which show [on] *an* embodiment of the invention. Other embodiments of the invention utilizing the same or equivalent principles may be used and structural changes may be made as desired by those skilled in the art without departing from the true spirit of the invention.

Turning now to the drawings:

FIG. 3 is a sectional view taken along line 3—3 in FIG. 1;

Figure 4A:
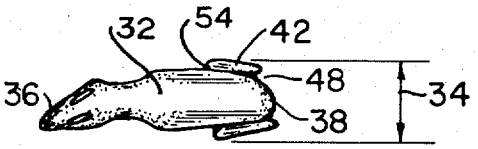

FIGS. 4A, B and C are views of one token embracing a part of my invention; and

Figure 5A:
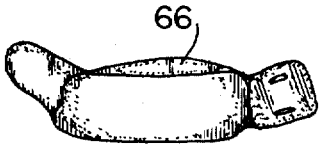
Figure 5B:
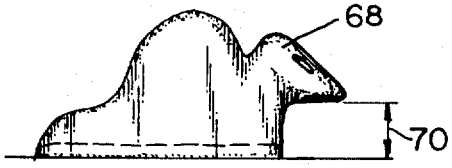
Figure 5C:
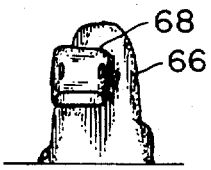

FIGS. 5A, B and C are views of another token embracing a part of my invention.

Figure 1:
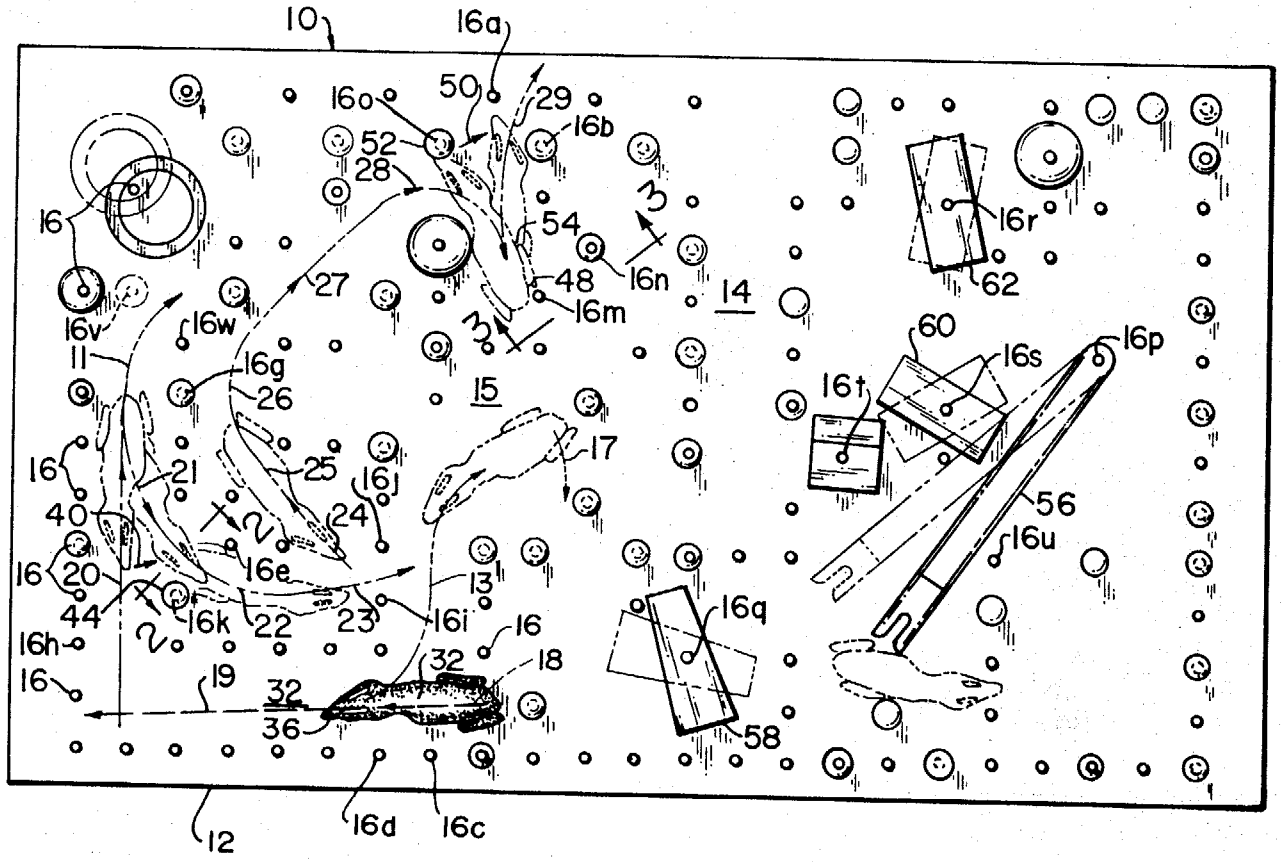
FIG. 1 is a plan view of the maze device board embodying my invention.

The invention is understood by referring first to FIG. 1, wherein maze device 10 embodying my invention includes board 12, having as shown in the drawing the generally smooth face or side 14 (shown in the plane of the drawing) fabricated to provide a working surface. Projecting from this surface is *elevated maze path defining means here comprising* a plurality of pins 16 secured to board 12 thereby defining a multiplicity of connected and intersecting path segments therebetween upon working surface 14. For purposes of illustration herein, reference is made to particular path segments 18–29, inclusive. For convenience, several connected segments may be designated by a single numeral, where such will not cause confusion. It is understood, however, that such segments exist everywhere upon the surface of the board between the aforementioned pins.

A playing piece or token 32 is provided slidably mounted on surface 14; and, in the position shown in solid line at FIG. 1, the token is located at one station. Thereafter, in a manner to be described in detail hereinbelow, the token may be slidably maneuvered to another station on the board remote from the first one. The former station is located at the end of vector 29, whereat the token may be slidably taken from the board between particular pins 16a and 16b, after having been continuously moved on surface 14 between the aforementioned stations along path segments 18, 19, 20, 21, 22, 23 (first portion up to intersection with 24), 24, 25, 26, 27, 28 and 29.

Figure 2:
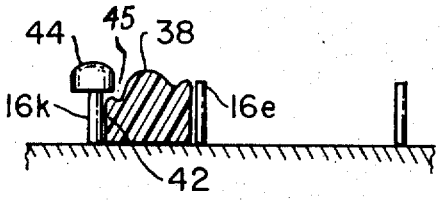
FIG. 2 is a sectional view taken along line 2—2 in FIG. 1.

[It should be noted,] *One of the features of the present invention is the forming of the path defining means and token with interfitting projection and recess portions 44 and 45, see FIG. 2, positioned to align in one predetermined orientation of the token in the path and being dimensioned when aligned for passage of the token, the portions being positioned to block such passage when the*

*oken is in another orientation in the path. Accordingly* ı maneuvering the token along the path described in the bove paragraph from one station to another remote there-:om, [that] a certain degree of rotation and side-tracking f the token is required to achieve the desired movement. uch requirements for maneuvering, which enhances the hallenge of my particular maze device, is one of its most esirable features *and* advantages.

To illustrate the foregoing, attention is directed first ɔ movement of the token along path segments 18, 19, art of 20 and then onto 21, the token being initially riented as shown by solid lines with nose section 36 in ıe direction of travel. If the user proceeds to slide the oken, nose section 36 leading, along segments, 18, 19, nd then, turning, along segments 20 and 11, choices which ıay well appear as logical to the user, the token will be stymied" in that further movement will be impossible ecause of the spacing between pins 16v and 16w and their npediments coacting so as to interfere with and block ıovement of the token.

The user is then compelled to bring the token back ɔ its initial starting point and devise [and] a sequence f maneuvers, in this case by side-tracking, so as to have he token with its rear quarter 38 in the direction of move-ıent along paths 18 and 19. This is so because in order for ıe token to proceed along path segments 20 and 21 to egment 22, it must approach pins 16k and 16[l]e with ormed protrusion 42 passing under, *and with fore and aft xtending recess 45 registering with,* mushroom-shaped im-ediment 44 secured to the top of pin 16k. The latter rela-ionship is shown in sectional detail in FIG. 2.

In order to achieve the foregoing required orientation f token 32, it is necessary for the user to side-track along ath segment 13 to region 15 where the token may be otated 180° in the direction of arrow 17. Thus reoriented, he token may be returned to its initial position between ins 16c, d except that now back end 38 of the token is riented in the direction of travel to be taken.

Now the token may proceed along segments 18, 19 and 0; after passing between pins 16h and 16k, forward por-ion 36 of the token may be slidably displaced in the direc-ion of arrow 40. Advancing between pins 16k and 16l long path segments 21 and 22, formed protrusion 42 asses beneath the overhanging mushroom impediment 44 ecured to the top of pin 16k, as mentioned above. In this nanner, a particular path comprising a particular sequence f connected path segments must be selected by the user f the device to [define] *find* the particular passage be-ween one station on the board to another.

[A further advantage of my particular maze device is hat a token's main axis curvature can] *A further feature f the present invention is the forming of the token of such hape that it will engage the sides of the maze path defined y the pins to prevent passage of the token through one or nore curved path segemnts when the token is advanced nto the curved segment with one end of the token as its eading edge, but will present an exterior configuration fit-ing within the confines of the segment for passage there-hrough when the token is advanced into the segment with 's opposite end as the leading edge. As here shown the oken is of elongated form having a curved longitudinal xis which will* co-function with angles in the path seg-nents, as in path segment 25, to provide passage there-ılong. In addition, the token as illustrated in the accom-ɔanying drawing has a narrow normally leading end and ı relatively broader normally trailing end with other varia-ions in horizontal width which facilitate the manipulation ıf the token through certain curved path segments. Pin .6g and the impediment secured thereto, and adjacent pins ırevent token 32 from advancing along path segments 24 nd 25 with end portion 36 leading. Only by reversing the oken to a position wherein its curvature coincides with hat of path segment 25, can the token proceed to path egment 26. To achieve the proper alignment of the oken, the narrow end 36 must be advanced between pins

16i and 16j along path segment 23, it being evident that token width 34 prevents the token from completely passing between pins 16i and 16j. Thereafter rear portion 38 of the token is slidably displaced clockwise with respect to head end 36, so that the token thereafter may be slidably maneuvered along path segments 25 and 26.

Another feature and particular advantage of the present invention is that the path segments through which the token may be slidably moved along the surface of the board to a desired final position or station remote from a given starting station are visually nonevident to the average user, unless and until the token is actually brought to a position adjacent particular pins through which movement is to be achieved. This is so because token-barring path segments such as indicated by vector 20, token-passing path segments, such as segment 21, and paths that can be traveled in only one manner of token orientation, such as segment 22, may differ from each other only by the existence or placement of one impediment, or by the existence and/or degree of curvature of the path segment. For example, token-barring path segment 11 as limited by pins 16v and 16w compared visually to token-passing path segment 21, as defined by pins 16e and 16k, and the curved path segment 23 as proscribed by pins 16[l], 16i, and 16k. As explained above, the interval between 16[g]*v* and 16[k]*w* is not great enough to permit passage of a particular piece such as token 32, while the interval between pins 16k and 16e is great enough to permit such passage. However, the difference between such intervals may be made so small that the cooperation between the intervals and the width of the token cannot be visually determined by the average user prior to actual trial of movement of the token between the various pins. In this way the mazelike movement of the token between two stations on the board via some of the sequences of path segments making up a particular path which permits such movement may not generally be visually discriminated from other such paths which bar such movement.

Figure 3:
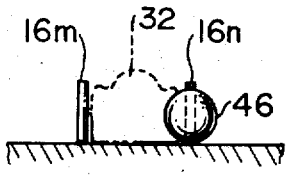
FIG. 3 is a sectional view taketn along line 3—3 in FIG. 1.

As mentioned hereinabove, the maze device of my invention is further enhanced by various impediments such as the mushroom-shaped head 44 secured to pin 16k, which coact with the token to further perplex the user in the selection of a mazelike path over which to slide the token. In the particular instance shown in FIG. 2, head 44 is shaped and positioned above working surface 14 so as to co-function with a predetermined portion of the token; that is, formed protrusion 42 of the token fits beneath the overhanging portion of the mushroom head so as to permit passage of the token beneath pins 16k and 16l. On the other hand, when the same token is advanced to a position between certain other adjacent pins, either one or both of which may be provided with such overhanging impediments, because of interference which may occur between a formed portion of the token and the overhanging portion of the pin, the token may be barred from movement on the path segment between such of said pins. This would be the case, for example, in attempting to slidably maneuver token 32 at any angle of approach between particularly pins 16m and 16n, seen toward the upper center section of FIG. 1 and shown in sectional view at FIG. 3. An outline of the token is shown for purposes of illustrating the attendant interference between the formed portions thereof and the pin obstructions themselves, particularly the protruding spherical impediment 46 secured to pin 16n.

Figure 4B:
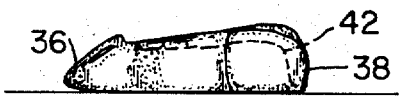
Figure 4C:
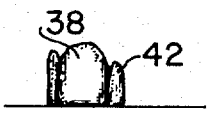

As a further example of illustrating the relationship between the various formed and shaped portions of the token of my invention and the manner of providing a devious mazelike path for movement along the working surface of the board, particular[ly] attention is now directed to path segments 28 and 29 in FIG. 1. Token 32 is shown in phantom lines positioned so as to advance via path segment 29 through the exit station defined by the interval beween particular pins 16a and 16b. With momentary reference to FIGS. 4A, 4B and 4C, wherein I show token 32 alone and in somewhat greater clarity, and with particular reference to FIG. 4A, protrusion 42, representing a fanciful rendition of the right rear leg of a mouse, is shaped to form *a transverse* recess 48 between protrusion 42 and back portion 38. Returning to FIG. 1, and the path segment 29 between pins 16m and 16n it can be seen by the phantom outline of token 32 resting between pins 16m and 16o, that the token may be maneuvered so that pin 16m is engaged in recess 48, thereby achieving clearance between the forward end of the token and pin 16[pin]*o* which supports impediment 52. Then, token 32 may be rotated about pin 16m in the direction of arrow 50 with the forward end of the token passing under the overhanging impediment 52, a movement that could not otherwise be achieved due to interferences and obstructions imposed by surrounding pins and impediments. Thereafter, and with the token now positioned by such pivotal movement *about* pin 16m, the token is permitted to be maintained on the path between pins 16o and 16b into the desired region of passage between pins 16a and 16b.

Thereafter, and when slidably removing the token in the direction of path segment 29, still another feature of my invention may become apparent. Recess 54 (FIG. 4A) receives pin 16b; and, to slidably move the token between pins 16a and 16b, it is necessary to pivot the token thereabout so that the angle of direction of movement of the token between pins 16a and 16b is such as to minimize the obstructing width of the token therethrough and permit passage to the desired end station [off] *of* the board.

Other variations of the types of impediments which may be associated with various of the pins protruding from the surface of the maze board are exemplified by elongate rod 56 pivotally secured by particular pin 16p; tapered block 58 pivotally secured to pin 16q; and rectangular blocks 60, 62, and 64 pivotally secured to pins 16r, 16s, and 16t, respectively. Such blocks, as indicated by the dashed lines in the vicinity thereof, are movable to first and second positions, the first position shown by the solid lines and the second position by the dashed lines, which are further characterized as barring movement of the token on the path between one of the named pins and a pin adjacent thereto, while the second position is characterized by permitting movement of the token between the block thus positioned and pins adjacent thereto.

More specifically, and as a single example of the foregoing, if token 32 is imagined maneuvered to a position shown by dashed lines in the lower right-hand portion of FIG. 1, slidable movement therefrom between rod 56 and pin 16u, as shown by the solid lines in the drawing, would not be possible. By rotating block 60 to the dashed line position and swinging rod 56 to its dashed line position, as shown in FIG. 1, token 32 may thereafter be slidably maneuvered between pin 16u and elongate rod 56.

A further feature of my invention is that other tokens, shaped to have a different predetermined form and dimensions compared to the token exemplified by piece 32, may be provided, resulting in an entirely different co-functioning with the various pins and impediments hereinabove described, causing entirely different paths to be traveled across the board from one station to another. For example, in FIGS. 5A, B and C, I show a fanciful token which may be made to resemble a snail, or the like, and which is further characterized by overhanging head portion 68 having an overhanging chin establishing clearance 70 between the chin and the surface upon which the token rests. Such clearance permits passage of the chin portion of token 66 above certain short pegs, for example peg and impediment 16n shown in section view in FIG. 3. Thus token 66 may proceed along path segments barred to a token having the shape and form such as that of token 32. The foregoing are exemplary of but two examples of enumerable form and dimension variations which I may employ in accordance with the invention herein to achieve other and different token shapes, so that a variety of different path segment sequences may be followed in slidably traversing a particular token from one station on the working surface of the maze board to another remote therefrom.

Although the foregoing detailed description of my invention is related to one embodiment of maze board and two specific token pieces for slidable engagement thereon, it is believed apparent that enumerable combinations of maze impediments and shaped token pieces designed to co-function therewith to achieve the various features of my invention will become apparent to one of ordinary skill in the art, yet be within the spirit of my invention and scope of appended claims.

I claim:

[1. A maze device comprising in combination:

a board having a generally smooth working surface;

a plurality of pins secured to said surface and projecting in a vertical direction therefrom, said pins forming a plurality of different paths that connect and intersect depending on the distances between said pins;

a slidable token having a flat bottom movable on said surface in one of the paths formed by said pins;

certain of said pins having an extending portion to engage said token therebetween and an adjacent pin transverse to the direction of the path;

said token having a portion reduced in width thereon that is complementary with said pin extending portion such that it will allow passage past said pin extending portion only when said complementary width is aligned with said extending portion; and the distances between adjacent pins forming the paths being such that the token may pass or may be barred from passing depending on whether or not there is engagement with adjacent pins of the path.]

[2. The maze device in accordance with claim 1 and wherein further at least one of said pin extending portions comprises an overhanging member spaced away from said surface of the board.]

3. The maze device in accordance with claim [1] 9 and wherein further means pivotally attached to one of said pins and movable to first and second positions, said first position being characterized by said means barring movement of said token on the path between the one of said pins and the pin adjacent thereto, and said second position being characterized by said means permitting movement of said token on said last mentioned path.

4. The maze device in accordance with claim [1] 9 wherein further the form of said token includes a *transverse* recess shaped and positioned to receive selected ones of said pins and provide for pivotal movement of the token about one of said last pins to permit the token to be maintained on the path between the one pin and the pin adjacent thereto.

[5. A maze device comprising in combination:

a board having a generally smooth working surface;

a plurality of pins secured to said surface and projecting in a vertical direction therefrom;

a multiplicity of connected and intersecting paths defined by said pins on said surface, a portion of one of said paths designated as a first station and another portion thereof remote from the first station designated as a second station;

an elongated token shaped to have a major longitudinal axis that is curved in a horizontal plane and include one surface thereof fabricated to slidably engage said working surface for maze movement thereon via at least one of said paths from said first station to said second station;

at least one curved path segment defined on the surface of said board by certain ones of said pins, said curved path segment being shaped to correspond to the major horizontal longitudinal axis of said token so that the token may be slidably maneuvered along said curved path segment only when aligned therewith and prevented from being slidably maneuvered along said curved path segment when not so aligned.]

*6. A maze device comprising:*

*a board and elevated path defining means, a portion of said path defining means designated as a first of said path defining means and another remote from the first designated as a second of said path defining means;*

*a token slidably mounted on said board and having leading and trailing ends;*

*said first of said path defining means and said token being formed with interfitting projection and recess portions positioned and dimensioned to register and to allow passage of said token only when said leading end is advanced as the leading edge in the direction of movement toward said second path defining means; and*

*said second of said path defining means and said token being formed with interfitting projection and recess portions positioned and dimensioned to register and to allow passage of said token only when said trailing end is advanced as the leading edge in the direction of movement away from said first of said path defining means.*

*7. A maze device in accordance with claim 6: said in-fitting projection and recess portions lying in a plane rallel with said board.*

*8. A maze device in accordance with claim 6: said in-fitting projection and recess portions lying in a plane rpendicular to said board.*

*9. A maze device comprising:*

*a board and elevated maze path defining means;*

*a token slidably mounted on said board for movement along said path; and*

*said path defining means and token being formed with interfitting projection and recess portions positioned to align in one predetermined orientation of said token in said path and being dimensioned for passage of said token past said path portion when in said orientation, said portions being positioned to block said passage when said token is in another orientation in said path;*

*said path defining means comprising a plurality of pins secured to said board and projecting vertically therefrom and forming a plurality of different paths that connect and intersect depending on the distances between said pins;*

*certain of said pins having a laterally extending portion defining said projection portion to engage said token therebetween and an adjacent pin transverse to the direction of the path, at least one of said pin extending portions overhanging said board in spaced relation thereto; and*

*said token being formed with a fore and aft extending recess defining said recess portion and positioned and dimensioned for receiving and passing said pin extending portions therethrough.*

References Cited

The following references, cited by the Examiner, are of record in the patented file of this patent or the original patent.

UNITED STATES PATENTS

| | | | |
|---|---|---|---|
| 1,027,691 | 5/1912 | Cleveland | 273—113 |
| 570,921 | 11/1896 | Feldhoff | 273—113 |
| 963,293 | 7/1910 | Johnson. | |
| 589,508 | 9/1897 | Mead | 273—111 |
| 797,105 | 8/1905 | Graves | 273—110 |
| 1,635,020 | 7/1927 | Wilkins | 273—109 |
| 2,525,738 | 10/1950 | Tormey | 273—153 X |

ANTON O. OECHSLE, Primary Examiner

U.S. Cl. X.R.

35—22 R; 273—113